United States Patent
Svinåmo (10) Patent No.: US 12,458,001 B2
(45) Date of Patent: Nov. 4, 2025

(54) SINGULATING DEVICE FOR ORGANISMS

(71) Applicant: ZOETIS SERVICES LLC, Parsippany, NJ (US)

(72) Inventor: Thomas Winje Svinåmo, Utskarpen (NO)

(73) Assignee: Zoetis Services LLC, Parsippany, NJ (US)

( * ) Notice: Subject to any disclaimer, the term of this patent is extended or adjusted under 35 U.S.C. 154(b) by 195 days.

(21) Appl. No.: 18/385,941

(22) Filed: Nov. 1, 2023

(65) Prior Publication Data

US 2024/0138380 A1 May 2, 2024

Related U.S. Application Data

(60) Provisional application No. 63/381,952, filed on Nov. 2, 2022.

(51) Int. Cl.
*A01K 61/95* (2017.01)
*A01K 61/13* (2017.01)
*A01K 63/00* (2017.01)

(52) U.S. Cl.
CPC .............. *A01K 61/95* (2017.01); *A01K 61/13* (2017.01); *A01K 63/00* (2013.01)

(58) Field of Classification Search
CPC ........ A01K 61/95; A01K 61/13; A01K 63/00; A01K 63/02; A01K 61/90
See application file for complete search history.

(56) References Cited

U.S. PATENT DOCUMENTS

| | | | |
|---|---|---|---|
| 1,689,919 A | 10/1928 | Heath | |
| 2004/0244712 A1* | 12/2004 | Massey | A01K 61/90 119/216 |
| 2014/0174371 A1* | 6/2014 | Ulriksen | A01K 61/10 119/219 |
| 2017/0071164 A1 | 3/2017 | Zucker et al. | |
| 2017/0172114 A1* | 6/2017 | Halse | A01K 63/065 |

(Continued)

FOREIGN PATENT DOCUMENTS

| CN | 109329364 | 2/2019 |
|---|---|---|
| CN | 109329364 A | 2/2019 |

(Continued)

OTHER PUBLICATIONS

PCT Search Report and Written Opinion, International Application No. PCT/US2023/078297, International Filing Date Nov. 1, 2023, Date of mailing May 17, 2024.

*Primary Examiner* — Ebony E Evans
(74) *Attorney, Agent, or Firm* — Scott C. Mayhew (57) ABSTRACT

An apparatus for singulating organisms includes a chute, an output nozzle, and a valve. The chute includes a first chute end that is open to receive a plurality of organisms and a second chute end. The output nozzle is formed in a funnel shape and has a first nozzle end and a second nozzle end. The valve is attached to the second chute end and the first nozzle end. The valve is movable to a range of positions including an open position and a closed position. One organism travels to and blocks the second nozzle end and another organism travels to the second chute end. The organism that is positioned at the output nozzle is discharged from the singulating device upon movement of the valve from the open position to the closed position.

17 Claims, 5 Drawing Sheets

(56) References Cited

U.S. PATENT DOCUMENTS

| | | | | |
|---|---|---|---|---|
| 2018/0206458 A1* | 7/2018 | Lindgren | ................... | F04F 5/10 |
| 2021/0267172 A1* | 9/2021 | Huber | ................... | A01M 29/12 |
| 2021/0368747 A1* | 12/2021 | Chrobak | ................... | G06T 7/70 |
| 2023/0189766 A1* | 6/2023 | Young | ................... | A01K 61/10 |
| | | | | 119/215 |
| 2024/0053618 A1* | 2/2024 | Martineau | .............. | H04N 23/56 |
| 2025/0107512 A1* | 4/2025 | Fujiwara | ................ | A01K 61/13 |

FOREIGN PATENT DOCUMENTS

| | | |
|---|---|---|
| CN | 109329363 | 12/2020 |
| CN | 109329363 A | 12/2020 |
| GB | 704282 | 2/1954 |
| WO | WO 2018/117856 A1 | 6/2018 |

\* cited by examiner

SINGULATING DEVICE FOR ORGANISMS

CROSS REFERENCE TO RELATED APPLICATION

This application claims the benefit of U.S. Provisional Patent Application No. 63/381,952, filed Nov. 2, 2022, which is expressly incorporated herein by reference in its entirety.

FIELD

The present disclosure relates to a singulating device for organisms, and more specifically for living and dead organisms.

BACKGROUND

This section provides background information related to the present disclosure which is not necessarily prior art.

Fish farming involves breeding and raising a plurality of fish within an enclosure. Wild fishery involves capturing a plurality of fish from a natural body of water. In both cases of fish farming and wild fishery, the plurality of fish often are transported to a holding unit, processed, and ultimately sold for human consumption. In one example, the processing may include individually vaccinating the fish. Accordingly, one fish at a time must be retrieved from the holding unit and presented into a machine or device for vaccinating. However, it is difficult to present only one fish from the holding unit and into the machine or device when the holding unit contains the plurality of fish. The fish may be sedated or dead and is unable to swim into the machine or device. Additionally, it is ineffective to manually process the plurality of fish, given the mass quantity of fish that are processed. Therefore, it is desirable to develop a singulating device that is able to overcome these challenges.

SUMMARY

This section provides a general summary of the disclosure, and is not a comprehensive disclosure of its full scope or all of its features.

In one example of the present disclosure, an apparatus for singulating organisms includes a chute, an output nozzle, and a valve. The chute includes a first chute end that is open to receive a plurality of organisms and a second chute end. The output nozzle is formed in a funnel shape and has a first nozzle end and a second nozzle end. The valve is attached to the second chute end and the first nozzle end, the valve is movable to a range of positions including an open position and a closed position. One organism travels to and blocks the second nozzle end and another organism travels to the second chute end, the organism that is positioned at the output nozzle is discharged from the apparatus upon movement of the valve from the open position to the closed position.

In another example of the present disclosure, an apparatus for singulating organisms includes a holding unit and a singulating device. The holding unit houses a plurality of organisms. The singulating device includes a chute, a valve, and an output nozzle. The chute extends between a first chute end that is open to receive a plurality of organisms from the holding unit and a second chute end that is attached to the valve. The output nozzle extends between a first nozzle end that is attached to the valve and a second nozzle end that is configured to discharge one of the organisms. The valve is positioned between the chute and the output nozzle. The valve is movable to a range of positions including an open position and a closed position. One organism travels to the second nozzle end and another organism travels to the second chute end. The organism that is positioned at the second nozzle end is discharged from the singulating device upon movement of the valve from the open position to the closed position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
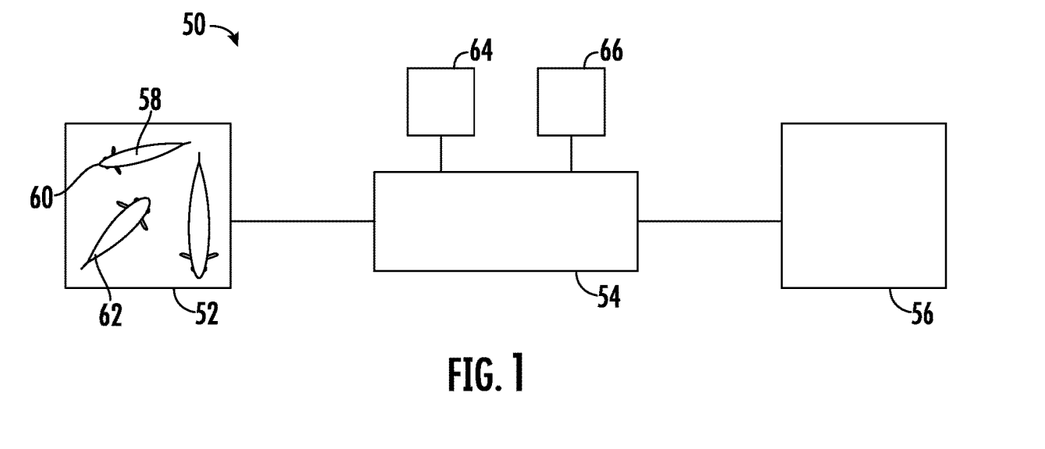
FIG. 1 is a schematic of the singulating system having a holding unit, a singulating device, and a receiving machine in accordance with the principles of the present disclosure.
Figure 2:
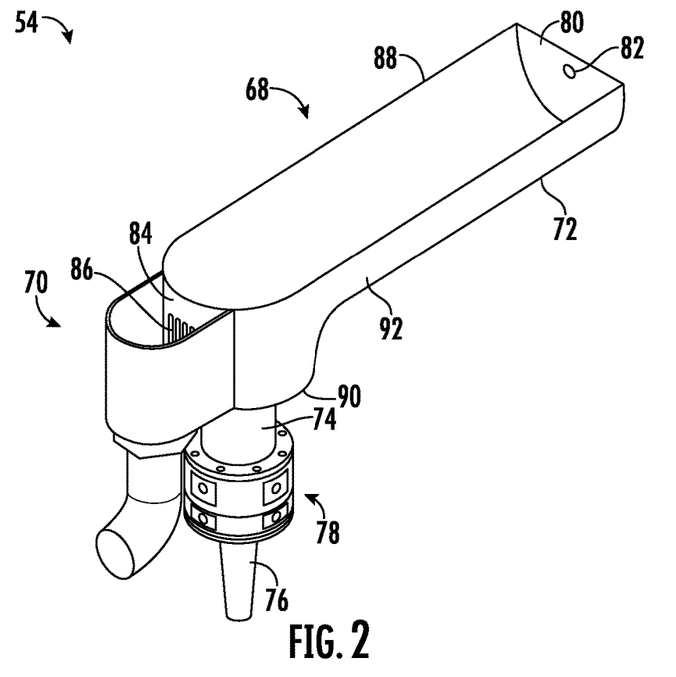
FIG. 2 is a perspective view of the singulating device of FIG. 1.
Figure 3:
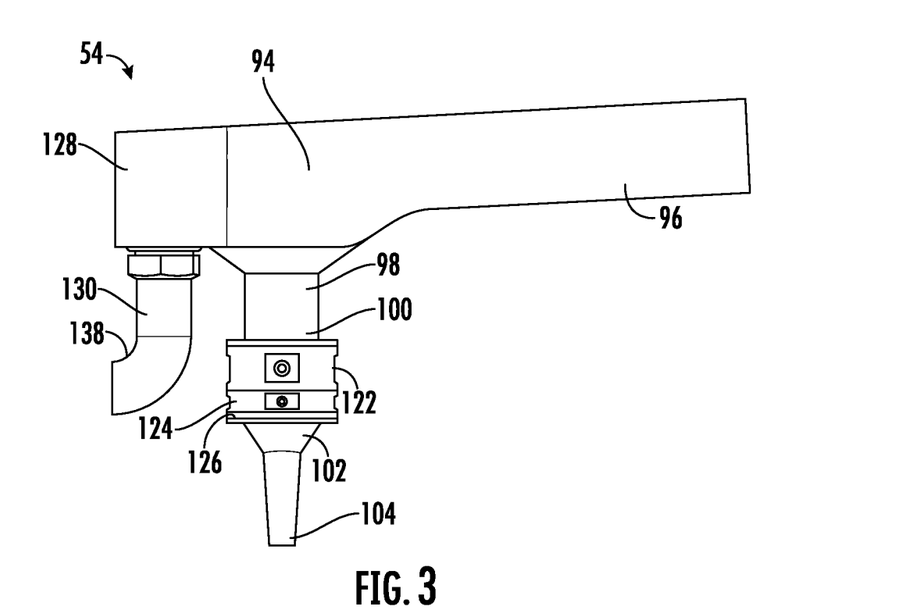
FIG. 3 is a side view of the singulating device of FIG. 1.
Figure 4:
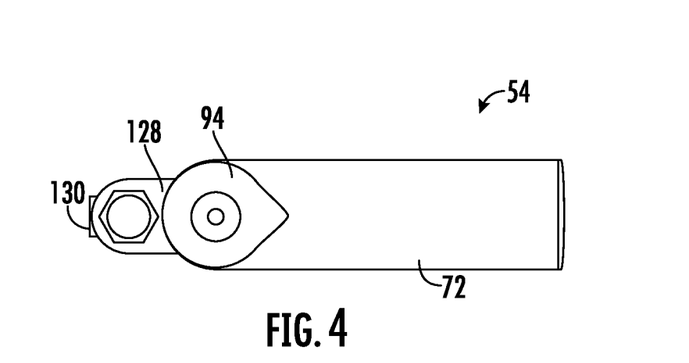
FIG. 4 is a top view of the singulating device of FIG. 1, where a valve is in an open position.

With reference to FIG. 1, the present disclosure provides a singulating system 50 that may include a holding unit 52, a singulating device 54, and a receiving machine 56. The holding unit 52 may include a plurality of organisms 58 and may contain a fluid. In one example, the organisms 58 may be fish having a head 60 and a tail 62. The organisms 58 may be living or dead and more specifically, the living organisms 58 may be sedated. The fluid may be water. The singulating device 54 may receive two or more organisms 58 at one end and discharge one organism at a time at an opposing end. The singulating device 54 may be attached to a water supply 64 and an air supply 66. The receiving machine 56 may receive the organism 58 from the singulating device 54. In some embodiments, the receiving machine 56 may be used for vaccinating the organism 58. In other embodiments, the receiving machine 56 may be used for further processing of the organism 58 into a food source, for example.

With reference to FIGS. 2-7, the singulating device 54 may include a singulating assembly 68 and an overflow assembly 70. The singulating assembly 68 may include a chute 72, a connecting tube 74, an output nozzle 76, and a valve assembly 78. The chute 72 may extend laterally between a first sidewall 80 having an aperture 82 and a second sidewall 84 having one or more slots 86. Furthermore, the chute 72 may include a first chute end 88 that is open and a second chute end 90 that forms a base 92 joining the first and second sidewalls 80, 84. The first chute end 88 receives the organisms 58 from the holding unit 52 (FIG. 1). The base 92 may have a funnel portion 94 and a holding portion 96. The holding portion 96 can be arranged in varying positions, such as being positioned substantially perpendicular to the funnel portion 94 and extend longitudinally from one side of the funnel portion 94. More specifically, the funnel portion 94 may be positioned adjacent to the slots 86 and be in fluid communication with the connecting tube 74.

The connecting tube 74 may be attached to the funnel portion 94 of the chute 72 at a first tube end 98 and to the valve assembly 78 at an opposing second tube end 100. The connecting tube 74 may be substantially cylindrical in shape with both the first and second tube ends 98, 100 open. In other words, the connecting tube 74 is in fluid communication with the chute 72 via the first tube end 98 and in fluid communication with the valve assembly 78 via the second tube end 100. The connecting tube 74 may be composed of an elastic material. In some embodiments, the connecting tube 74 may be composed of a flexible silicone.

The output nozzle 76 may extend longitudinally between a first nozzle end 102 and a second nozzle end 104. The output nozzle 76 may be formed in substantially a funnel shape such that the first nozzle end 102 has a greater lateral dimension (i.e., diameter, width) than the second nozzle end 104. The first nozzle end 102 abuts the valve assembly 78 and includes one or more apertures 106 annularly spaced apart. In some embodiments, the output nozzle 76 may be composed of an elastic material, and more specifically, a flexible silicone. In other embodiments, the output nozzle 76 may be an iris valve. In yet another embodiment, the output nozzle 76 may be formed in any suitable configuration including a fabric material and an elastic material.

Figure 5:
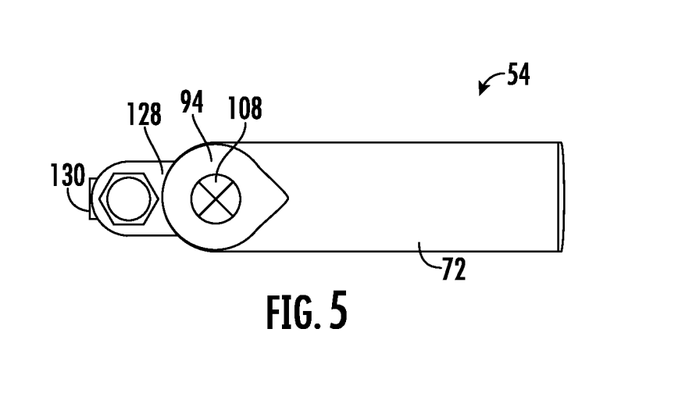
FIG. 5 is a top view of the singulating device of FIG. 1, where the valve is in a closed position.
Figure 6:
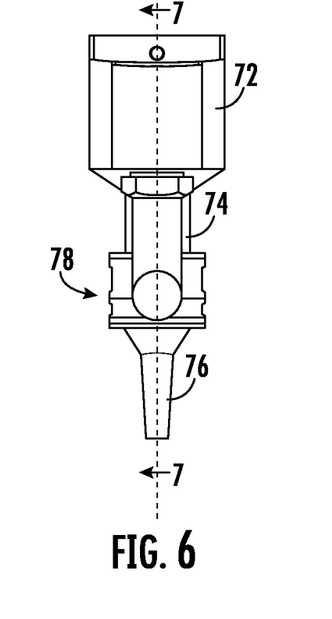
FIG. 6 is a front view of the singulating device of FIG. 1.
Figure 7:
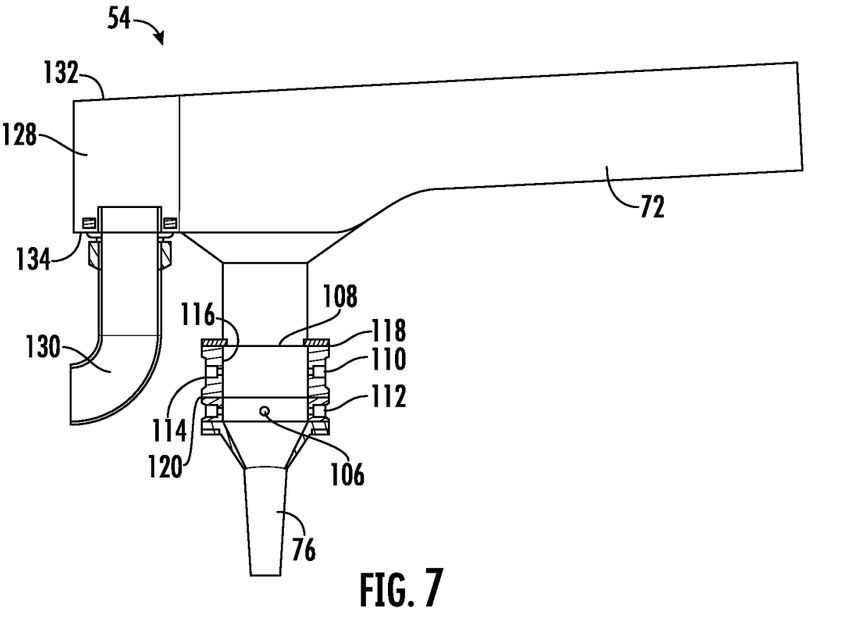
FIG. 7 is a sectional view of the singulating device of FIG. 1.

The valve assembly 78 may be positioned longitudinally between the connecting tube 74 and the output nozzle 76. The valve assembly 78 includes a valve 108, one or more air inlets 110, and one or more water inlets 112. The valve 108 is movable to a range of positions including an open position (FIG. 4) and a closed position (FIG. 5). The open position allows fluid communication between the connecting tube 74 and the output nozzle 76 and the closed position restricts fluid communication between connecting tube 74 and the output nozzle 76. In some embodiments, the valve 108 may be an elastomer membrane valve. In other embodiments, the valve 108 may be an iris valve. The valve 108 may include an outer valve surface 114 and an inner valve surface 116. The valve 108 may further include an upper arm 118 positioned adjacent to the connecting tube 74 and a lower arm 120 positioned adjacent to the output nozzle 76. In other words, the upper and lower arms 118, 120 are positioned at longitudinally opposed ends of the valve 108. The upper and lower arms 118, 120 may extend outward from the outer valve surface 114. A first ring 122 may be disposed annularly about the valve 108 and receive the upper arm 118, thereby attaching the valve 108 with the connecting tube 74.

The one or more air inlets 110 are connected to the air supply 66 (FIG. 1) and may be positioned within the first ring 122. The air inlets 110 may be positioned longitudinally between the upper and lower arms 118, 120. More specifically, the air inlets 110 extend radially through the first ring 122 and are disposed adjacent to the outer valve surface 114 such that air may travel from the air supply 66 (FIG. 1) to the outer valve surface 114. In some embodiments, there may be two air inlets 110 at diametrically opposed positions of the first ring 122. In other embodiments, there may be three or more air inlets 110 annularly spaced apart within the first ring 122.

The one or more water inlets 112 are connected to the water supply 64 (FIG. 1) and may be positioned within a second ring 124. The second ring 124 is disposed annularly about the output nozzle 76 and positioned longitudinally below the lower arm 120 of the valve 108 in abutting contact. The water inlets 112 extend radially through the second ring 124 and abuts the apertures 106 of the output nozzle 76 such that water may flow from the water supply 64 (FIG. 1) to the output nozzle 76. In other words, the water inlets 112 are aligned with the aperture 106 of the output nozzle 76. In some embodiments, there may be two water inlets 112 at diametrically opposed positions. In other embodiments, there may be three or more water inlets 112 annularly spaced apart. The second ring 124 and the water inlets 112 may be secured to the output nozzle 76 using a flange 126 that extends annularly about the output nozzle 76 and is positioned below the second ring 124 in abutting contact.

Figure 9:
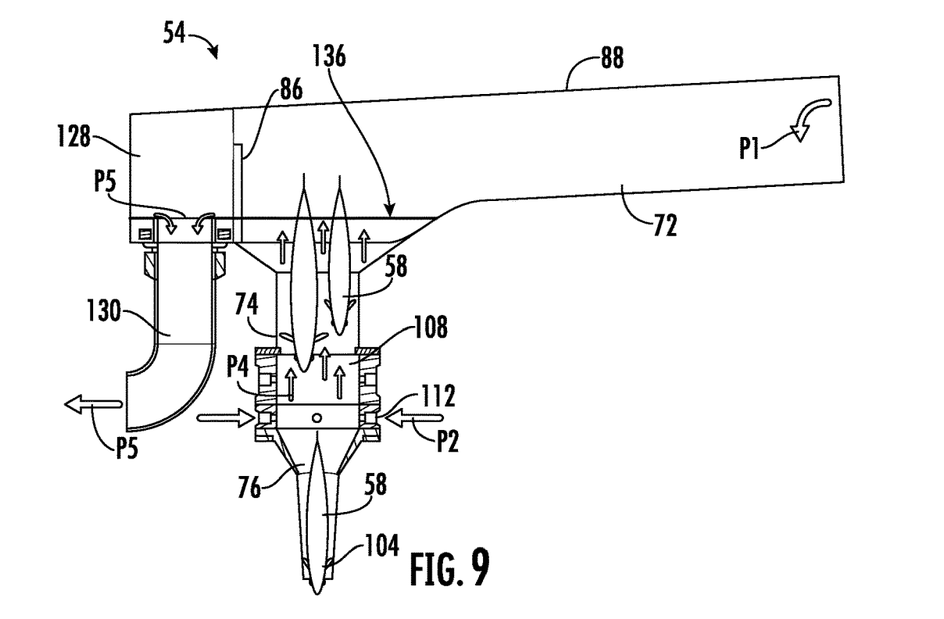
FIG. 9 is a sectional view of the singulating device of FIG. 1, where the singulating device is in charged mode.

The overflow assembly 70 may extend laterally from the singulating assembly 68. More specifically, the overflow assembly 70 and the singulating assembly 68 share the second sidewall 84. The overflow assembly 70 may include an overflow reservoir 128 and an overflow outlet 130. The overflow reservoir 128 is in fluid communication with the chute 72 via the slots 86. The overflow reservoir 128 may extend between a first overflow end 132 that is open and a second overflow end 134. The overflow outlet 130 is received in and sealed to the second overflow end 134. The overflow outlet 130 may be partly positioned within the overflow reservoir 128 to create a minimum fluid level 136 (as shown in FIG. 9). Accordingly, fluid in the overflow reservoir 128 must exceed the minimum fluid level 136 before the fluid enters the overflow outlet 130. The overflow outlet 130 may be a tube that includes one or more bends 138. The overflow outlet 130 may be attached to a reservoir (not shown) for disposal of the fluid.

Figure 8:
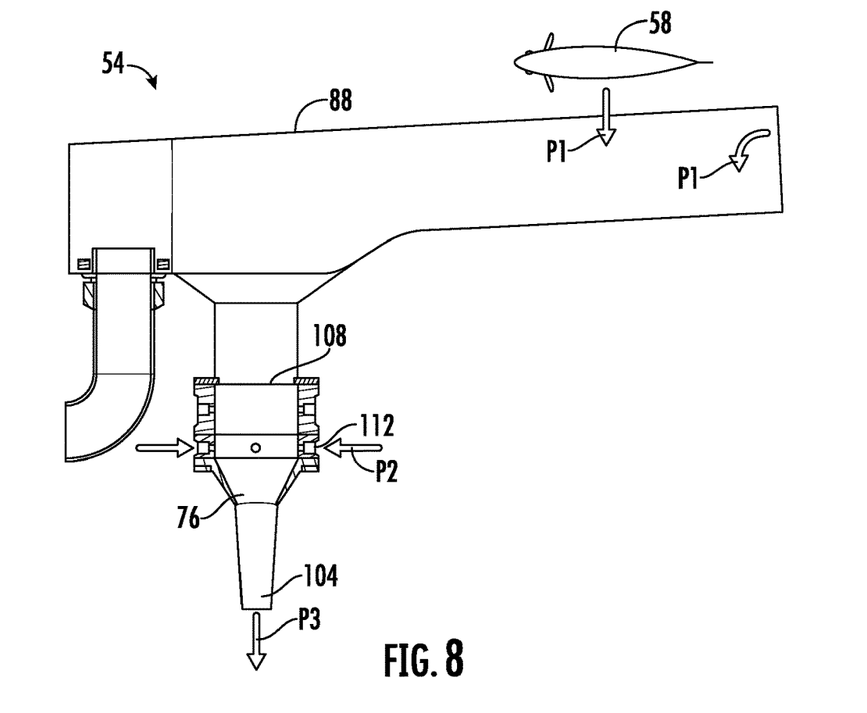
FIG. 8 is a sectional view of the singulating device of FIG. 1, where the singulating device is in standby mode.

The operation of the singulating system 50 will now be described in detail. With reference to FIG. 8, the singulating device 54 is in standby mode. From the holding unit 52 (FIG. 1), organisms 58 and water may begin to enter the first chute end 88 along path P1. The valve 108 is in the open position and additional water is supplied from the water supply 64 (FIG. 1) through the water inlets 112 and into the output nozzle 76 along path P2. The water may be supplied along path P2 at a varied water flow rate to create a pulse. Water from the first chute end 88 and water from the water inlets 112 flow to the second nozzle end 104 for discharge along path P3.

With reference to FIG. 9, the singulating device 54 is in charged mode. The plurality of organisms 58 have entered the singulating device 54 and water continues to enter the chute 72 via the first chute end 88 along path P1. One organism 58 travels to the second nozzle end 104 of the output nozzle 76 and is held in position by the friction and upward elastic force of the output nozzle 76. One or more organisms 58 thereafter travels to the connecting tube 74. The valve 108 remains in the open position. Water continues to enter the output nozzle 76 through the water inlet 112 along path P2. However, flow of water is reversed from path P3 (FIG. 8) due to the second nozzle end 104 being blocked by the organism 58. Water now flows along path P4 from the output nozzle 76 into the chute 72. Accordingly, the organisms 58 positioned within the connecting tube 74 are kept substantially above the valve 108 because the organisms 58 are neutrally buoyant. However, the singulating device 54 may also operate with organisms 58 that are not neutrally buoyant, such as organisms 58 that are fast sinking or fast floating. If the water level is above the minimum water level 136, water may flow through the slots 86 and into the overflow outlet 130 for discharge along path P5.

Figure 10:
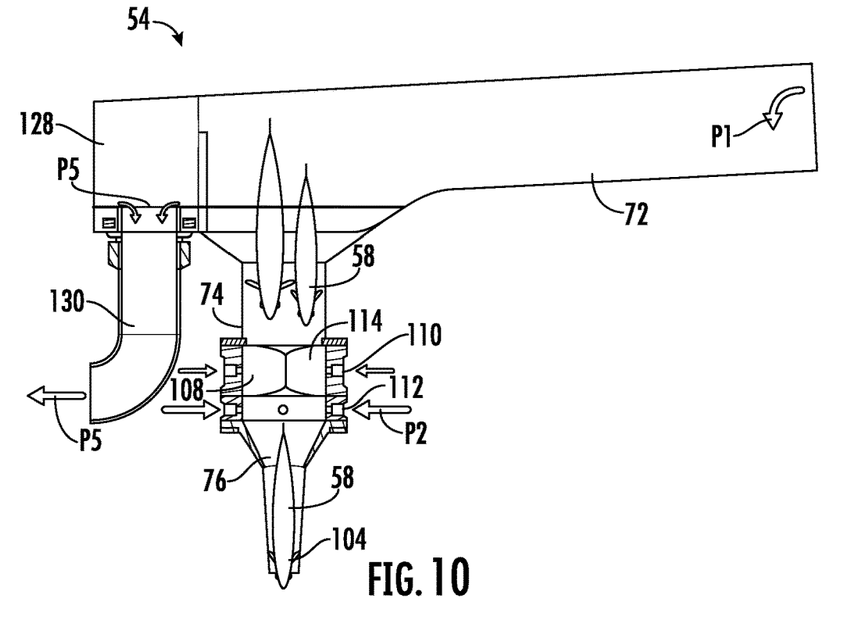
FIG. 10 is a sectional view of the singulating device of FIG. 1, where the singulating device is in discharge initiation mode.
Figure 11:
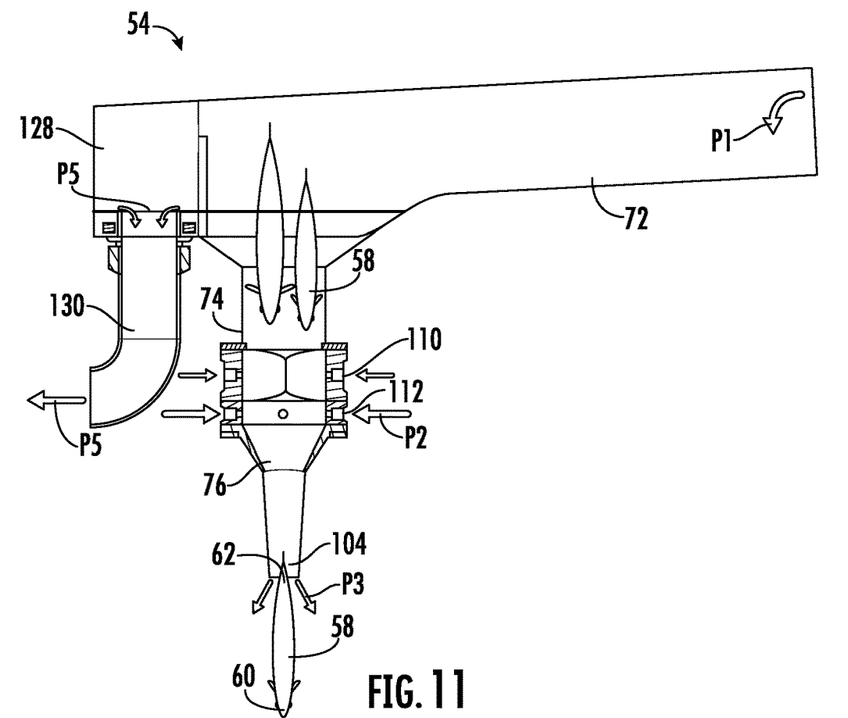
FIG. 11 is a sectional view of the singulating device of FIG. 1, where the singulating device is in discharge complete mode.

With reference to FIG. 10, the singulating device 54 is in the discharge initiation mode. The organisms 58 remain within the connecting tube 74 and one organism 58 continues to be positioned within the output nozzle 76 at the second nozzle end 104. Water continues to flow into the chute 72 along path P1 and into the output nozzle 76 along P2. Water may also continue to flow into the outflow reservoir 128 and out of the overflow outlet 130 along path P5. Air enters the air inlets 110 and presses against the outer valve surface 114 to move the valve 108 from the open position to the closed position. Air may enter the air inlets 110 at a varied air flow rate to create a pulse. In one example, the varied air flow rate and the varied water flow rate along path P2 is synchronized such that the pulse of both water and air are supplied at the same time. Closing the valve 108 increases the water pressure within the output nozzle 76 because the upward flow path P4 (FIG. 9) is blocked by the valve 108 and the downward flow path P3 (FIG. 8) is blocked by the organism 58. In some embodiments, pressurized air is utilized instead of standard air to further increase the water pressure within the output nozzle 76. As shown in FIG. 11, the increase in water pressure within the output nozzle 76 overcomes the friction and elastic pressure that previously held the organism 58 at the second nozzle end 104. Accordingly, water travels along path P3 and forces the organism 58 to exit the singulating device 54 through the second nozzle end 104. The organism 58 is discharged in a vertical orientation.

Accordingly, the singulating system 50 is operable to continuously discharge one organism 58 at a time after receiving the plurality of organisms 58. The singulating system 50 is compatible with organisms 58 that are living and does not substantially affect the mortality of the organism 58. Advantageously, the organism 58 is discharged from the singulating device 54 in an automatic manner and at a consistent rate. Compared against a constant flow rate of water, supplying water along path P2 at the varied water flow rate to create the pulse provides a number of advantages. First, the pulse enables a higher rate of discharging the organisms 58 from the singulating device 54. Additionally, the pulse is beneficial in defining a precise discharge period that substantially reduces a gap time between when one organism 58 is discharged from the singulating device 54 and when the next organism 58 is discharged. Furthermore, the pulse allows for a tighter output nozzle 76 that is used accommodate a wide range of sizes of the organism 58. The range of sizes of the organism 58 may have a size ratio of about 3, where the size ratio is the size of the largest organism relative to the size of the smallest organism. In one example, the size of the organism 58 may be measured by weight and the weight of the organism 58 may range from about 25 grams to about 75 grams.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for singulating organisms comprising:
   a chute including a first chute end that is open to receive a plurality of organisms and a second chute end;
   an output nozzle formed in a funnel shape and having a first nozzle end and a second nozzle end;
   a valve assembly having a valve attached to the second chute end and the first nozzle end, the valve is movable to a range of positions including an open position and a closed position; and
   wherein one organism travels to and blocks the second nozzle end and another organism travels to the second chute end, the organism that is positioned at the output nozzle is discharged from the apparatus upon movement of the valve from the open position to the closed position.

2. The apparatus of claim 1, wherein the chute extends between a first sidewall having an aperture and a second sidewall having at least one slot.

3. The apparatus of claim 2, further comprising an overflow assembly extending from the chute and having an overflow reservoir and an overflow outlet, the overflow reservoir being in fluid communication with the chute via the at least one slot.

4. The apparatus of claim 2, wherein the second chute end forms a base joining the first and second sidewalls.

5. The apparatus of claim 4, wherein the base has a funnel portion positioned adjacent the at least one slot.

6. The apparatus of claim 5, further comprising a connecting tube having a first tube end attached to the funnel portion such that the connecting tube and the funnel portion are in fluid communication, and the connecting tube further having a second tube end attached to the valve assembly.

7. The apparatus of claim 6, wherein the connecting tube is composed of an elastic material.

8. The apparatus of claim 1, wherein the first nozzle end abuts the valve assembly and includes a plurality of valve apertures annularly spaced apart.

9. The apparatus of claim 1, wherein the output nozzle is composed of an elastic material.

10. The apparatus of claim 1, wherein the valve assembly includes the valve, at least one air inlet, and at least one water inlet.

11. The apparatus of claim 10, wherein the valve has an upper arm positioned adjacent to the connecting tube, and the valve further has a lower arm positioned adjacent to the output nozzle, the upper and lower arms extending outward from an outer valve surface.

12. The apparatus of claim 11, further comprising a first ring disposed annularly about the valve and configured to receive the upper arm, thereby attaching the valve with the connecting tube.

13. The apparatus of claim 1, wherein the valve is an elastomer membrane valve.

14. An apparatus for singulating organisms comprising:
    a holding unit housing a plurality of organisms; and
    a singulating device including a chute, a valve assembly, and an output nozzle,
       wherein the chute extends between a first chute end that is open to receive a plurality of organisms from the holding unit and a second chute end that is attached to the valve;
       wherein the output nozzle extends between a first nozzle end that is attached to the valve and a second nozzle end that is configured to discharge one of the organisms;
       wherein the valve is positioned between the chute and the output nozzle, the valve is movable to a range of positions including an open position and a closed position; and
       wherein one organism travels to the second nozzle end and another organism travels to the second chute end, the organism that is positioned at the second nozzle end is discharged from the singulating device upon movement of the valve from the open position to the closed position.

15. A method for singulating organisms, comprising:
    providing organisms to a singulating device having a chute, a valve assembly, and an output nozzle;
    transporting the organisms down the chute by using water;
    opening a valve of the valve assembly and supplying additional water from a water supply so as to transport one of the organisms into blocking contact with a nozzle end of the output nozzle; and
    supplying air to the valve assembly so as to move the valve to a closed position, thereby increasing water pressure within the output nozzle and forcing the organism to exit the output nozzle at the nozzle end.

16. The method of claim 15, wherein the additional water is supplied at a varied water flow rate and the air is supplied at a varied air flow rate.

17. The method of claim 16, wherein the varied air flow rate and the varied water flow rate is synchronized such that a pulse of both water and air are supplied at the same time.

* * * * *